(12) United States Patent
Lee et al.

(10) Patent No.: US 8,597,784 B2
(45) Date of Patent: Dec. 3, 2013

(54) RADIATION CURABLE POLY(ISOBUTYLENE) ADHESIVE COPOLYMERS

(75) Inventors: Hae-Seung Lee, Woodbury, MN (US); Guy D. Joly, Shoreview, MN (US); Joon Chatterjee, Bloomington, MN (US); Marie Aloshyna ep Lesuffleur, Woodbury, MN (US); Jay M. Jennen, Forest Lake, MN (US); Jingjing Ma, Cottage Grove, MN (US); Gregg A. Caldwell, Cottage Grove, MN (US); Babu N. Gaddam, Woodbury, MN (US); Larry R. Krepski, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 213 days.

(21) Appl. No.: 13/169,573

(22) Filed: Jun. 27, 2011

(65) Prior Publication Data

US 2012/0082847 A1 Apr. 5, 2012

Related U.S. Application Data

(60) Provisional application No. 61/388,283, filed on Sep. 30, 2010.

(51) Int. Cl.
*C09J 7/02* (2006.01)
*C08J 3/28* (2006.01)
*C09J 123/36* (2006.01)
*C09J 123/26* (2006.01)

(52) U.S. Cl.
USPC .............. 428/345; 522/113; 522/53; 522/63; 525/50

(58) Field of Classification Search
None
See application file for complete search history.

(56) References Cited

U.S. PATENT DOCUMENTS

| | | | |
|---|---|---|---|
| 2,803,615 A | 8/1957 | Ahlbrecht et al. | |
| 3,842,059 A | 10/1974 | Milkovich et al. | |
| 4,181,752 A | 1/1980 | Martens et al. | |
| 4,288,575 A * | 9/1981 | Gardner | 525/332.3 |
| 4,329,384 A | 5/1982 | Vesley et al. | |
| 4,533,723 A | 8/1985 | Weitemeyer | |
| 4,619,979 A | 10/1986 | Kotnour et al. | |
| 4,732,808 A | 3/1988 | Krampe et al. | |
| 4,843,134 A | 6/1989 | Kotnour et al. | |
| 5,204,219 A | 4/1993 | Van Ooij et al. | |
| 5,459,174 A * | 10/1995 | Merrill et al. | 522/35 |
| 5,464,900 A | 11/1995 | Stofko, Jr. et al. | |
| 5,468,353 A | 11/1995 | Anich et al. | |
| 5,567,775 A | 10/1996 | Wang et al. | |
| 5,602,221 A | 2/1997 | Bennett et al. | |
| 5,639,546 A | 6/1997 | Bilkadi | |
| 5,824,717 A | 10/1998 | Merrill | |
| 5,852,148 A | 12/1998 | Behr et al. | |
| 6,063,838 A | 5/2000 | Patnode et al. | |
| 6,380,149 B2 | 4/2002 | Flynn et al. | |
| 6,608,120 B1 * | 8/2003 | Milne et al. | 522/171 |
| 6,630,238 B2 | 10/2003 | Hyde et al. | |
| 6,632,522 B1 | 10/2003 | Hyde et al. | |
| 6,664,354 B2 | 12/2003 | Savu et al. | |
| 6,861,139 B2 | 3/2005 | Takeda | |
| 2006/0141244 A1 * | 6/2006 | Hatada | 428/336 |
| 2009/0281002 A1 | 11/2009 | Casper | |

FOREIGN PATENT DOCUMENTS

| | | |
|---|---|---|
| EP | 0 252 372 | 1/1988 |
| EP | 0 448 902 | 10/1991 |
| EP | 0 372 756 | 12/1993 |
| EP | 10176156 | 6/1998 |
| EP | 1 057 861 | 12/2000 |
| EP | 1 757 629 | 2/2007 |
| EP | 1757629 A1 * | 2/2007 |
| GB | 1276673 | 6/1972 |
| WO | WO 92/11295 | 7/1992 |
| WO | 2006/093702 | 9/2006 |
| WO | 2009/148722 | 12/2009 |

OTHER PUBLICATIONS

PCT International Search Report, PCT/US2011/049042.
Chung, et al., "Butyl rubber graft copolymers: synthesis and characterization," Polymer, vol. 36, No. 18, pp. 3565-3574, 1995.
U.S. Appl. No. 61/414,043, entitled "Ionically Crosslinkable Poly(isobutylene) Adhesive Polymers," filed Nov. 16, 2010.
U.S. Appl. No. 61/414,046, entitled "UV Curable Anhydride-modified Poly(isobutylene)," filed Nov. 16, 2010.
U.S. Appl. No. 61/414,492, entitled "Isobutylene (Co)polymeric Adhesive Composition," filed Nov. 17, 2010.
U.S. Appl. No. 61/419,017, entitled "Moisture Curable Isobutylene Adhesive Copolymers," filed Dec. 2, 2010.
U.S. Appl. No. 13/027,484, entitled "Isobutylene Copolymer with Grafted Polymer Groups," filed Feb. 15, 2011.
U.S. Appl. No. 61/432,388, entitled "Methods for Treating Siliciclastic Hydrocarbon-bearing Formations with Fluorinated Amine Oxides," filed Jan. 13, 2011.
U.S. Appl. No. 61/424,990, entitled "Method for Treating Carbonate Hydorcarbon-bearing Formations with Fluoorinated Amine Oxides," filed Dec. 21, 2010.
Abbate, et al., "Maleated Polyisobutylene: A Novel Toughener for Unsaturated Polyester Resins," Journal of Applied Polymer Science, vol. 58, Issue 10, pp. 1825-1837, (1995).
Shirai, et al., "Photoacid and photobase generators: Chemistry and applications to polymeric materials", Progress in Polymer Science, vol. 21, pp. 1-45, (1996).

\* cited by examiner

*Primary Examiner* — Mark Ruthkosky
*Assistant Examiner* — Alexandre Ferre
(74) *Attorney, Agent, or Firm* — Kent S. Kokko

(57) ABSTRACT

The disclose provides pressure-sensitive adhesives and adhesive sealants prepared from modified, crosslinked isobutylene copolymers, and tape articles prepared therefrom.

19 Claims, No Drawings

RADIATION CURABLE POLY(ISOBUTYLENE) ADHESIVE COPOLYMERS

CROSS REFERENCE TO RELATED APPLICATIONS

This application claims the benefit of U.S. Provisional Patent Application No. 61/388,283, filed Sep. 30, 2010, the disclosure of which is incorporated by reference herein in its entirety.

TECHNICAL FIELD

This invention relates to pressure-sensitive adhesives and adhesive sealants prepared from isobutylene copolymers, and tape articles prepared therefrom. The pressure-sensitive adhesives are characterized by exhibiting an overall balance of adhesive and cohesive characteristics and exceptional adhesion to low surface-energy substrates.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are a wide variety of pressure sensitive adhesive (PSA) materials available today that include natural crude or synthetic rubbers, block copolymers, and acrylic ester based polymeric compositions. Central to all PSAs is a desired balance of adhesion and cohesion that is often achieved by optimizing the physical properties of the acrylic elastomer, such as glass transition temperature and modulus. For example, if the glass transition temperature ($T_g$) or modulus of the elastomer is too high and above the Dahlquist criterion for tack (storage modulus of $3 \times 10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

SUMMARY

The adhesive (co)polymers of this disclosure comprise: a) an isobutylene copolymer having pendent, free-radically polymerizable, ethylenically unsaturated groups, b) a tackifier, and c) a crosslinking agent. In one aspect the pressure-sensitive adhesive comprises the interpolymerized reaction product of isobutylene and at least one monomer having a pendent, free-radically polymerizable, ethylenically unsaturated group.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

In some embodiments, hot melt adhesive compositions are provided which applied to substrates from the melt. Such hot melt adhesive compositions are substantially solvent-free. Hot melt adhesives are versatile and widely used in industrial applications, such as bookbindings, cardboard boxes, plastic parts and wooden articles, among others. They are generally 100% solid adhesives with application temperatures which vary from about 150 to about 180° C., In recent years, there has been a significant increase of the usage of low surface energy, olefin-based thermoplastics (e.g., polyethylene, polypropylene, ethylene propylene diene monomer rubber (EPDM)) in automotives, paints, appliances and electronics markets. The advantages of the new materials include affordable cost, easy processibility, and excellent mechanical properties. However, this trend creates a challenge in terms of making adhesive bonds to these low energy surfaces.

When considering adhesive tapes, pressure-sensitive adhesive (PSA) tapes are the easiest to use, but for the most part, pressure-sensitive adhesives do not adhere well to low surface energy substrates. Additionally, most PSAs are unsuited for uses requiring good internal (cohesive) strength at elevated temperatures. For example, rubber-resin PSAs tend to soften and degrade when heated. PSAs based on styrene-containing block copolymers also do not retain good internal strength when heated, because styrene has a low $T_g$ and so softens at moderately elevated temperatures. Currently the bonding to low surface-energy surfaces is achieved by priming the substrate with polar liquid followed by application of PSAs. Even after this two step process, the existing PSAs do not fulfill customer requirements. There is need to develop primerless LSE PSAs at competitive cost but still with the most optimized properties.

Recently, polyisobutylene (PIB) has been considered as an attractive material for low surface energy (LSE) bonding applications due to its excellent adhering properties on olefin-based thermoplastics. In addition, the excellent moisture and oxygen barrier properties of PIB suggest that PIB-based materials have potential use in electronic and photovoltaic encapsulation applications. In spite of its beneficial properties, low cohesive strength of the material has limited the uses for high shear applications. Another possible application for PIB-based material is in the medical adhesive field. Most acrylate-based PSAs are not suitable for medical application since acrylate PSAs tend to give off toxic vapors at elevated temperatures. Acrylate-based PSAs typically contain monomeric materials which, even at ordinary room temperatures, exude odors that make acrylate PSA tapes generally unsuitable for medical uses. Polyisobutylene PSAs are often used for medical uses because they are physiologically inert, but again they tend to be deficient in internal strength.

The adhesive compositions of the present disclosure provide an improved pressure-sensitive and hot-melt adhesive composition which may be adhered to a variety of substrates, including low surface-energy (LSE) substrates, within a wide temperature range and provide good adhesive strength and holding characteristics. The adhesive compositions are easily handled, and are environmentally friendly due to the low volatile organic compound (VOC) content, such as solvents. The adhesive compositions of the present disclosure further provide a pressure-sensitive adhesive article, such as adhesive tapes and sealants.

DETAILED DESCRIPTION

The adhesive copolymer comprises an isobutylene copolymer having pendent, free-radically polymerizable, ethylenically unsaturated groups, b) a tackifier, and c) a photo-crosslinking agent. In one aspect the pressure-sensitive adhesive comprises the interpolymerized reaction product of isobutylene and at least one monomer having pendent, free-radically polymerizable, ethylenically unsaturated group(s), including alkenyl, allyl and vinyl groups.

The monomer having pendent, free-radically polymerizable, ethylenically unsaturated groups may be derived from halogenated butyl rubber and is of the general formula:

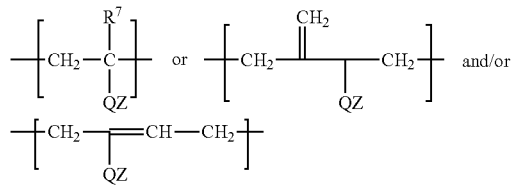

wherein Q is a multivalent, preferably divalent linking group and Z is a pendent, free-radically polymerizable, ethylenically unsaturated group and $R^7$ is H or $CH_3$. More particularly, the isobutylene copolymer may be of the formula;

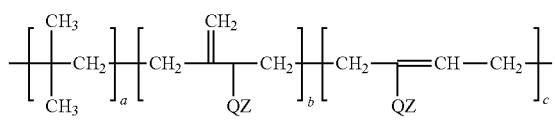

wherein a is at least 20, and at least one of b and c are at least one, Q is a polyvalent linking group and Z is a pendent, free-radically polymerizable, ethylenically unsaturated group; or

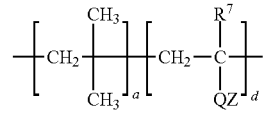

wherein a and d are at least 1, preferably a is at least 20, d is at least one, $R^7$ is H or $CH_3$, Q is a polyvalent linking group and Z is a pendent, free-radically polymerizable, ethylenically unsaturated group.

With respect to the copolymers of Formulas I and II it will be recognized that the monomer units having the subscript "a" are interpolymerized isobutylene monomer units. The polymerizable Z group is a non-conjugated ethylenically unsaturated group selected from alkenyl, alkynyl and allyl groups, and is preferably not a vinyloxy group, e.g. $CH_2$=CHO— or (meth)acrylate group. The -Q-Z moiety may be of the formula:

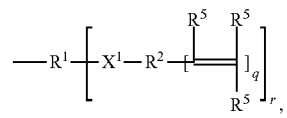

where
$R^1$ is a multivalent alkylene or arylene, $X^1$ is —O—, —$O_2C$—, —$NR^4$—, where $R^4$ is H or $C_1$-$C_4$ alkyl, or —$R^2$—$C(R^5)$=$CR^5_2$; $R^2$ is a multivalent saturated or unsaturated alkylene or arylene, and each $R^5$ is independently selected from H or $C_1$-$C_4$ alkyl, and any two of the $R^5$ groups may be taken together to form a carbocyclic ring, q is 1 or 2 and r is 1 to 5.

It will be understood with respect to the above formula, that when $X^1$ is —$NR^4$—, then $R^4$ may be selected as —$R^2$—$C(R^5)$=$CR^5_2$, providing compounds of the formula:

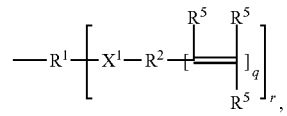

where $R^1$, $R^2$, $R^5$ and r are as previously defined.

In certain preferred embodiments, the -Q-Z moiety may be of the formula —$R^1$—[$X^1$—($R^2$—CH=$CH_2$)$_q$]$_r$, i.e. all $R^5$ groups are H, q is 1 or 2 and r is preferably 1.

Further, with regard to Formulas I and II, the subscripts "b" and "c" or "d" are chosen such that the copolymer comprises 1 to 20 wt. % of the respective monomer units: e.g. b and c are such that the -Q-Z monomer units comprise 1 to 20 wt. % of the copolymer.

The copolymer of Formulas I and II are generally prepared by nucleophilic displacement of commercially available halogenated PIBs, including halogenated poly(isobutylene-co-methylstyrene), halogenated poly(isobutylene-co-isoprene). Alternatively, a non-halogenated PIB-based material may be halogenated, then subsequently substituted. The halogen moiety in those materials allows introduction of the pendent ethylenically unsaturated groups.

The reaction scheme involves a displacement reaction with a "nucleophilic ethylenically unsaturated compound"; an organic compound with at least one nucleophilic functional group and least one ethylenically unsaturated group (hereinafter a "nucleophilic unsaturated compound"). The unsaturated group may be an alkenyl, including vinyl, allyl or allyloxy and the nucleophilic functional group may be an amino, carboxyl or hydroxy group. Preferably the unsaturated group is not a vinyloxy group, e.g. $CH_2=CHO—$ or (meth)acrylate group. As carboxyl groups are less nucleophilic than hydroxyl or amines, the nucleophilic substitution may be enhanced by using a phase-transfer catalyst such as tetra-n-butylammonium hydroxide.

In some embodiments, the nucleophilic unsaturated compound is a polyunsaturated compound having a hydroxyl group and one or more unsaturated groups, including terpene alcohols and acids, which are derived from plant materials. In other embodiments, the nucleophilic unsaturated compound consists of a carboxy group with one or more unsaturated groups such as those carboxy compounds derived from unsaturated fatty acids such as linoleic acid, linolenic acid, and arachidonic acid.

In such embodiments, where the adhesive is derived from terpene alcohols or acids, this disclosure provides an adhesive composition derived from renewable resources. In such embodiments, the present invention further provides an adhesive article, wherein the substrate or backing is also derived from renewable resources. The increase in the price of oil, and concomitant petroleum-derived products, has led to volatile prices and supply for many adhesive products. It is desirable to replace all or part of the petroleum-based feedstocks with those derived from renewable sources, such as plants, as such materials become relatively cheaper, and are therefore both economically and socially beneficial. Therefore, the need for such plant-derived materials has become increasingly significant.

Terpene alcohols and acids are a well-defined class of compounds that are based on five-carbon isoprene units and have at least one hydroxyl, which can be primary, secondary, or tertiary or carboxylic acid group. The terpene alcohols and acids are acyclic or mono-, bi- or tricyclic, mono- or poly-olefinically unsaturated alcohols of vegetable origin containing between 10 and 40 carbon atoms. Terpene alcohols and acids are structurally similar to terpene hydrocarbons except the structure also includes some hydroxyl or carboxyl functionality. Terpene alcohols and acids may be found in essential oils and are generally available through commercial sources.

Examples of unsaturated aliphatic terpene alcohols include geraniol, nerol, citronellol, hydroxycitronellol, linalool, α-terpenol, borneol, isoborneol, terpinen-4-ol, limonen-4-ol, carveol, lavandulol, menthol, 8-p-cymenol, cis-pinanol, trans-pinanol, dihydromyrcenol, myrcenol, dihydrolinalool, isomenthol, neomenthol, isopulegol, trans-p-menthane-3,8-diol, isoborneol, globulol, cedrol, menthol, sobrerol, umbellulol, nerolidol, pinanediol, farnesol, frenchyl alcohol, eugenol, phytol, isophytol, phytantriol, verbenol, trans-pinocarveol, carveol, nopol, cimenol, piperitol, anethol, camphenol, limonenol, abietyl alcohol, dihydroabietyl alcohol, 2-hydroxy-methyl-5-norborene, 6,6-dimethyl bicyclo(3,1,1)-2-heptene-2-ethanol, and combinations thereof. As will be understood, the corresponding amine or carboxyl substituted terpenes may also be used.

In some embodiments useful unsaturated nucleophilic compounds include those of the formula:

III

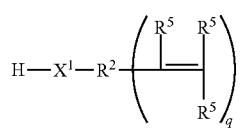

wherein
$X^1$ is —O—, —$O_2C$—, —$NR^4$—, where $R^4$ is H or $C_1$-$C_4$ alkyl, or —$R^2$—$C(R^5)=CR^5_2$; $R^2$ is a multivalent saturated or unsaturated alkylene or arylene, and each $R^5$ is independently selected from H or $C_1$-$C_4$ alkyl, and any two of the $R^5$ groups may be taken together to form a carbocyclic ring, such as are found in many terpene alcohols, and q is 1 or 2. Preferably q is greater than 1. The resulting nucleophilic polyunsaturated compounds allow the addition of multiple crosslinking sites on the copolymer.

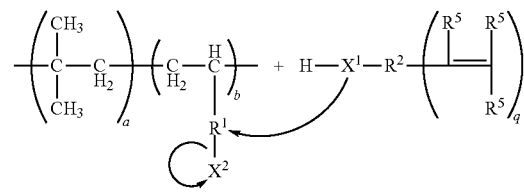

where
$X^1$ is —O—, —$O_2C$—, —$NR^4$—, where $R^4$ is H or $C_1$-$C_4$ alkyl, or —$R^2$—$C(R^5)=CR^5_2$; $R^2$ is a multivalent saturated or unsaturated alkylene or arylene, and each $R^5$ is independently selected from H or $C_1$-$C_4$ alkyl, and any two of the $R^5$ groups may be taken together to form a carbocyclic ring, such as are found in many terpene alcohols, and q is 1 or 2;
$X^2$ is a leaving group such as a halide, and preferably a bromide,
$R^1$ is a multivalent alkylene or arylene. As can be seen in the above scheme, the isobutylene copolymer having pendent, free-radically polymerizable, ethylenically unsaturated groups is prepared by nucleophilic displacement of a halogenated isobutylene copolymer, with a nucleophilic ethylenically unsaturated compound.

Compounds of Formula III include terminally mono-, di- or poly-unsaturated ethers of polyols such as 1,3-butylene glycol, 1,4-butanediol, 1,6-hexanediol, cyclohexane dimethanol, neopentyl glycol, caprolactone modified neopentylglycol hydroxypivalate, diethylene glycol, dipropylene glycol, bisphenol-A, trimethylolpropane, neopentyl glycol, tetraethylene glycol, tricyclodecanedimethanol, triethylene glycol, tripropylene glycol; glycerol, pentaerythritol, and dipentaerythritol pentaacrylate.

Useful nucleophilic unsaturated compounds include hydroxyalkenes such as allyl alcohol, methallyl alcohol, allyloxyethyl alcohol, 2-allyloxymethylpropanol (from dimethylolethane), and 2,2-di(allyloxymethyl)butanol (from trimethylolpropane), as well as the corresponding amines, particularly diallylamine.

The copolymers of isobutylene may include those wherein isobutylene is copolymerized with another monomer, which may be subsequently modified to include the pendent unsaturated group. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). In some embodiments, the copolymers are substantially homopolymers of isobutylene, for example, polyisobutylene resins, which may be subsequently modified to include the pendent unsaturated group, available under the tradenames OPPANOL (BASF AG) and GLISSOPAL (BASF AG). The copolymers also include copolymers of mostly isobutylene with n-butene or butadiene, which may be subsequently modified to include the pendent unsaturated group. In some embodiments, a mixture of copolymers may be used, i.e., the first polyisobutylene comprises a homopolymer of isobutylene and the second polyisobutylene comprises butyl rubber, or the first polyisobutylene comprises butyl rubber and the second polyisobutylene comprises a copolymer of isobutylene, subsequently modified. Blends of isobutylene homopolymer and modified poly(isobutylene) are also contemplated.

The isobutylene copolymer may comprise a random copolymer of isobutylene and modified paramethylstyrene units, wherein said random copolymer contains 1 to 20% by weight of said modified paramethylstyrene units and has a crosslinked structure. This random copolymer is, for example, commercially available from Exxon Chemical Co. under the trade name of EXXPRO series, and examples thereof include MDX90-10, MDX89-4. A portion of the methyl groups at the para-position of this paramethylstyrene can be brominated to form a site for the subsequent nucleophilic displacement by a compound of Formula III. Accordingly, a crosslinked structure can be formed by the technique described in detail hereinafter. Particularly, regarding the copolymer MDX90-10, 1.2% by mol of paramethylstyrene, which is contained in the copolymer in the amount of 7.5% by weight, is brominated. Regarding MDX89-4, 0.75% by mol of paramethylstyrene, which is contained in the copolymer in the amount of 5% by weight, is brominated. In addition, bromination of paramethylstyrene and random polymerization between isobutylene and paramethylstyrene, for the purpose of producing a random copolymer, can be performed by known techniques.

Paramethylstyrene monomer units can also impart heat resistance and strength to the copolymer by the cohesive force and hardness of paramethylstyrene itself. To obtain such an effect, paramethylstyrene is preferably contained in the copolymer in amounts of greater than zero, preferably about 1 to 20 parts by weight based on the total amount of the copolymer. When the amount of paramethylstyrene is smaller than 1 part by weight, the cohesive force is insufficient and it becomes difficult to obtain enough adhesion to endure practical use. On the other hand, when the amount of paramethylstyrene is larger than 20 parts by weight, the flexibility is drastically lowered and the adhesion as an important characteristics of the adhesive disappears and, therefore, it becomes impossible to refer to it as a pressure-sensitive adhesive any longer.

Conventional adhesives do not adhere well to certain substrates, such as certain types of automotive paints and low energy surfaces. Efforts have been made to improve the adhesion of adhesives, i.e., develop more aggressive tack, to these types of surfaces; tackifying the base polymer is commonly practiced. Various types of tackifiers include phenol modified terpenes, hydrocarbon resins such as polyvinyl cyclohexane and poly(t-butyl styrene), and rosin esters such as glycerol esters of rosin and pentaerythritol esters of rosin.

Various types of tackifiers include phenol-modified terpenes and rosin esters such as glycerol esters of rosin and pentaerythritol esters of rosin that are available under the trade names Nuroz™, Nutac™ (Newport Industries), Permalyn™, Staybelite™, Foral™ (Eastman). Also available are hydrocarbon resin tackifiers that typically come from C5 and C9 monomers by products of naphtha cracking and are available under the trade names Piccotac™, Eastotac™, Regalrez™, Regalite™ (Eastman), Arkon™ (Arakawa), Norsolene™, Wintack™ (Cray Valley), Nevtack, LX (Neville Chemical Co.), Hikotack™, Hikorez™ (Kolon Chemical), Novares™ (Rutgers N.V.), Quintone™ (Zeon), Escorez™ (Exxonmobile Chemical), Nures™, and H-Rez™ (Newport Industries).

Conventional tackified pressure-sensitive adhesives can also appear cloudy, demonstrating a loss in the characteristic transparency found in many conventional pressure-sensitive adhesive compositions. The cloudiness is an indication of limited or incomplete compatibility of the tackifier and the polymers. The reduced compatibility can lead to a degradation of adhesive properties on aging, as evidenced by a loss of tack or reduced peel adhesion. In some cases, the addition of a tackifier to an adhesive composition can be clear and appear to be compatible. However, after removing the solvent, curing the adhesive, or on aging, the adhesive can become cloudy, indicating some incompatibility between the tackifier and acrylic base polymer.

In many embodiments, the present disclosure provides tackified adhesive compositions that overcome problems noted in the art. The tackifier is preferably selected from a material that is essentially free of any ethylenically or acetylenically unsaturated bonds. The tackifier includes, but is not limited to, hydrogenated rosin resins, hydrogenated and esterified rosin resins, hydrogenated terpene resins, aliphatic petroleum resins, aromatic petroleum resins, alicyclic petroleum resins obtained by hydrogenating aromatic petroleum resins, and the like. Preferably, the tackifier used is selected from hydrogenated $C_9$ petroleum resins such as but not limited to Regalrez™ tackifiers (Eastman) or Arkon™ (Arakawa) tackifiers. Such "hydrophobic tackifiers", may be used in amounts of greater than zero, e.g. 10 to 150 parts, preferably 10 to 100 parts, of said tackifier, relative to 100 parts of said isobutylene co)polymer.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of from 0 to about 200 parts by weight per 100 parts by weight of the copolymer.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

In some embodiments, the adhesive compositions, particularly pressure-sensitive adhesive compositions, are applied as a solvent solution or dispersion, the solvent evaporated, and the adhesive composition crosslinked on exposure to actinic radiation, such as UV. Crosslinking of such solvent-based compositions may occur before, but preferably occurs after coating and solvent removal. Suitable solvents such as alkanes, ethyl acetate, toluene and tetrahydrofuran which are unreactive with the functional groups of the components of the copolymer In other embodiments, such as hot-melt adhesive compositions, the adhesive is applied from the melt as is solvent-free. Hot melt coating a PSA composition eliminates the necessity of solvent processing. To hot melt process an adhesive composition, the composition must not be crosslinked before and during the coating process; however, to achieve a PSA with balanced properties (i.e., peel and shear adhesion), the composition eventually must be crosslinked. In hot melt coating processes, this is usually done by exposure to high energy radiation (e.g., E-beam or high intensity ultraviolet radiation). Commonly, when high intensity ultraviolet radiation is used, a photoactive crosslinking species such as benzophenone is added to the composition. Generally, the hot melt adhesive compositions require a narrower range of molecular weights for the poly(isobutylene) copolymer than do solution coated compositions. Too low and the crosslinked polymer has insufficient cohesive strength. Too high and the composition cannot be extrusion coated. Generally, the molecular weight of the unmodified poly(isobutylene) copolymer is from 50,000 to 5,000,000, preferably from 100,000 to 300,000 ($M_w$).

Conventional hot melt adhesives have poor adhesion at temperatures above their melting points and low heat resistance, which limits the use. Since conventional hot melt adhesives cannot maintain sufficient adhesion at high temperatures, they cannot be used in many applications. The instant compositions provide reactive hot melt adhesives that overcome this deficiency. As the instant adhesive compositions crosslink after bonding, they provide improved heat resistance.

The adhesive composition may be combined with a crosslinker and cured by actinic radiation. Suitable crosslinkers include, but are not limited to: aldehydes, such as benzaldehyde, acetaldehyde, and their substituted derivatives; ketones such as acetophenone, benzophenone and their substituted derivatives; quinones such as the benzoquinones, anthraquinone and their substituted derivatives; thioxanthones such as 2-isopropylthioxanthone and 2-dodecylthioxanthone; and certain chromophore-substituted vinyl halomethyl-sym-triazines such as 2,4-bis-(trichloromethyl)-6-(3', 4'-dimethoxyphenyl)-sym-triazine. The concentration of crosslinkers can be present in the range of 0.05 to 6.0, preferably 0.1 to 2 percent by weight of the polymer, and more preferably 0.5 to 1.5 percent by weight.

The adhesive composition can be cured using a source of actinic radiation of sufficient energy (i.e., wavelength range) to generate free radicals when incident upon the particular photoactive crosslinking agent selected for use in the composition. The preferable wavelength range for the photoactive crosslinking agents disclosed above is 400 to 250 nm. The radiant energy in this preferred range of wavelengths required to crosslink the adhesive film of the invention is 100 to 1500 millijoules/cm$^2$ and more preferably 200 to 800 millijoules/cm$^2$. Details of the photocure process are disclosed in U.S. Pat. Nos. 4,181,752 and 4,329,384

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference. Those skilled in the art will also know that other additives such as fillers, antioxidants, stabilizers, and colorants may be blended with the adhesive for beneficial properties.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

EXAMPLES

As used in this section, the word polymer may be a homopolymer or a co-polymer, or a mixture thereof.

Test Methods:
90° Angle Peel Adhesion Strength Test.

Peel adhesion strength was measured at a 90° angle using an IMASS SP-200 slip/peel tester (available from IMASS, Inc., Accord Mass.) at a peel rate of 305 mm/minute (12 inches/minute) using the procedure described in ASTM International standard, D3330, Method F. Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were stored at 23° C./50% RH for 24 hours before testing. Two samples were tested for each example and averaged values were expressed in N/dm. Failure mode was noted and recorded as COH—cohesive, i.e., the adhesive split leaving residue on both the tape and test surface, ADH—adhesive, i.e., the adhesive peeled cleanly from the test surface, and 2-B (2-Bond)—the adhesive peeled away from the backing.

TABLE 1

Peel Adhesion Test Panel Materials

| Material | Solvent |
| --- | --- |
| HDPE—High density polyethylene | Isopropyl alcohol |
| PP—Polypropylene | Isopropyl alcohol |
| EPDM—Ethylene/propylene/diene monomer copolymer | Isopropyl alcohol |
| Thermoplastic Elastomer (TPE) based on EPDM and polypropylene | Isopropyl alcohol |
| SS—Stainless Steel | Heptane |
| Glass—Soda-lime glass | Heptane |

Static Shear Strength

The static shear strength was evaluated as described in the ASTM International standard, D3654, Procedure A at 23° C./50% RH (relative humidity) using a 1000 g load and/or at 70° C. using a 500 g load. Tape test samples measuring 1.27 cm×15.24 cm (½ in.×6 in.) were adhered to 1.5 inch by 2 inch stainless steel (SS) panels using the method to clean the panel and adhere the tape described in the peel adhesion test. The tape overlapped the panel by 1.27 cm×2.5 cm. and the strip was folded over itself on the adhesive side, and then folded again. A hook was hung in the second fold and secured by stapling the tape above the hook. The weight was attached to the hook and the panels were hung in a 23° C./50% RH room or a 70° C. oven. The time to failure in minutes was recorded. If no failure was observed after 10,000 minutes, the test was stopped and a value of >10,000 minutes was recorded. The mode of failure described in the peel adhesion test was also noted.

Percent Gel Test

The percent gel was determined as described in the ASTM International standard, D3616-95. A round test specimen measuring 63/64 inch in diameter was die-cut from a tape coated with the polymer and cured. The specimen was placed in a mesh basket measuring 1½ inch×1½ inch. The basket with the specimen was weighed to the nearest 0.1 mg and placed in a capped jar containing sufficient toluene to cover the sample. After 24 hours the basket (containing the specimen) was removed, drained and placed in an oven at 120° C. for 30 minutes. The percent gel was determined by calculating weight % of the remaining, unextracted portion to the original sample. A disc of the uncoated polyester backing material of the same size as the specimen was die-cut and weighed. The formula used for percent gel determination is shown below.

Percent Gel (wt. %)=((Unextracted sample wt. after extraction–uncoated polyester backing wt.)/ (Original sample wt.–uncoated backing wt.))× 100

Materials Used for Examples
The following materials are available from ExxonMobil Corporation (Baytown, Tex.)
  EXXPRO 3745 copolymer—brominated poly(isobutylene-co-methylstyrene)
  ESCOREZ 1310—hydrocarbon based tackifier
  ESCOREZ 5340—cyclic hydrocarbon based tackifier
The follow materials are available from Sigma Aldrich (St. Loius, Mo.)
  Benzophenone
  Diallylamine
  Triethylamine (TEA)
  Tetrabutylammonium Bromide (TBAB)
  3,7,11-Trimethyl-2,6,10-dodecatrien-1-ol (Farnesol)
  trans-3,7-Dimethyl-2,6-octadien-1-ol (Geranosol)
  3,7-Dimethyl-2,6-octadienoic acid (Geranic Acid)
  10-Undecenoic acid
  2,4-Hexadienoic acid (Sorbic Acid)
  trans,trans-2,4-Hexadien-1-ol (Sorbic Alcohol)
  Sodium cyanide
Other materials used
  Bromo Butyl Rubber—brominated poly(isobutylene-co-isoprene)—Lanxess (Frieberg, Switzerland)
  OPPANOL B 15 polymer—polyisobutylene (Medium MW 80K g/mol unfunctionalized synthetic rubber) available from (BASF, Florham Park N.J.)
  GLISSOPAL 1000—unfunctionalized polyisobutylene (Low MW 1000 g/mol) available from BASF, Florham Park, N.J.
  2,4-bis-trichloromethyl-6(4-methoxy-phenyl)-S-triazine
  Diethyl diallylmalonate (Alfa Aesar, Ward Hill, Mass.)
  Lithium aluminum hydride (Alfa Aesar, Ward Hill, Mass.)
  Sodium hydroxide (EMD, Gibbstown, N.J.)
  2-Allylpent-4-en-1-ol (Detailed synthesis procedure follows)
  2-Allylpent-4-enoic acid (Detailed synthesis procedure follows)
  Hostaphan® 3SAB—primed polyester film available from Mitsubishi, Greer S.C.

Preparation of 2-Allylpent-4-en-1-ol

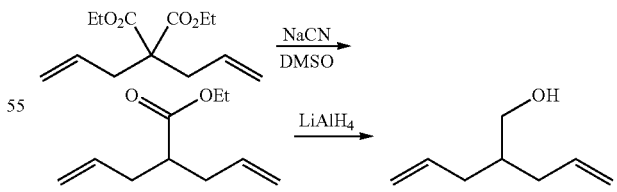

Part I: Preparation of 2-allylpent-4-enoic acid ethyl ester

Following the procedure of A. L. J. Beckwith and G. Moad (J. Chem. Soc. Perkin II, 1975, 1726-1733), a mixture of diethyl diallylmalonate (30.0 g, 125 mmol) and sodium cyanide (12.0 g, 0.24 mol) in 75 mL of dimethyl sulfoxide was stirred and heated at 155° C. for 6 hours, then allowed to cool to room temperature. After the addition of 100 mL of water, the mixture was extracted with 6 50 mL portions of petroleum ether. The combined petroleum ether extracts were washed once with 50 mL of water, dried over potassium carbonate, filtered and solvent removed at reduced pressure to leave 18.8 g of a light yellow oil. The oil was distilled and product collected at a temperature of 79-82° C. and a pressure of 5 mm to provide 14.6 g of 2-allylpent-4-enoic acid ethyl ester as a colorless oil whose structure was confirmed by NMR analyses.

Part II: Preparation of 2-allylpent-4-en-1-ol

To a stirred solution of 2-allylpent-4-enoic acid ethyl ester (prepared above, 14.5 g, 86.2 mmol) in diethyl ether (125 mL) was added lithium aluminum hydride (3.3 g, 87 mmol) in portions slowly over a 30 minute period to cause vigorous gas evolution. When addition of the lithium aluminum hydride was complete, the reaction mixture was stirred for one more hour a room temperature, then 3.5 mL of water were added very slowly. Then 7 mL of a 10 weight percent solution of sodium hydroxide in water were added, followed by the addition of 10 more mL of water. The precipitated white solid was removed from the colorless solution by filtration. Solvent was removed from the solution at reduced pressure to leave 10.1 g of 2-allylpent-4-en-1-ol as a colorless oil whose structure was confirmed by NMR analyses.

Preparation of 2-Allylpent-4-enoic acid

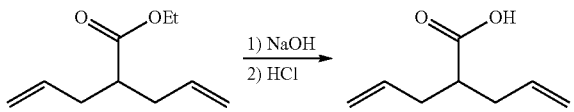

To a stirred solution of 2-allylpent-4-enoic acid ethyl ester (prepared above, 9.0 g, 54 mmol) in 50 mL of methanol and 2 mL of water was added sodium hydroxide (2.5 g, 63 mmol, available from EMD). The solution was stirred for 15 hours, then heated at reflux temperature for 2 hours. After cooling the reaction mixture to room temperature, solvent was removed at reduced pressure. To the residue were added 75 mL of diethyl ether and 10 mL of concentrated hydrochloric acid. The mixture was stirred at room temperature for 10 minutes, then the layers were separated and the diethyl ether layer was dried over magnesium sulfate. After filtration to remove the magnesium sulfate, solvent was removed at reduced pressure to leave 4.1 g of 2-allylpent-4-enoic acid as a colorless oil whose structure was confirmed by NMR analyses.

Preparation of Polymers

Polymer 1—Diallylamine-Modified Polyisobutylene in Toluene

In a three-neck, round-bottomed flask equipped with a reflux condenser, thermometer, and a nitrogen inlet was placed EXXPRO 3745 co-polymer (6.17 g), diallylamine (0.37 g), TEA (0.31 g), and toluene (55.49 g). The contents of the flask were stirred with a magnetic stir bar under nitrogen at room temperature. Once all the components completely dissolved, the flask was heated to 105° C. After 5 hours, the reaction was cooled to room temperature and vacuum filtered with a fritted funnel (5 µm pore size) to remove the HBr-TEA salt which formed during the reaction. The filtrate was poured into acetone to coagulate the modified polymer. The isolated polymer was washed with fresh acetone three times to remove residual diallylamine and TEA. The polymer was then filtered and was dried in a vacuum oven for 12 hours at 50° C., and then cooled to room temperature.

Polymer 2—Diallylamine-Modified Polyisobutylene without Solvent

Polymer 2 was prepared by mixing 14 g of EXXPRO 3745 and 6 g of OPPANOL B15 polyisobutylene in a Brabender mixer 50° C., with roller blade attachments rotating at 100 rpm. After 8 minutes of mixing, 1.32 g of diallylamine was added drop wise into the mixture and allowed to mix for another 5 minutes. Then 2 g of ESCOREZ-1310 tackifier and 2.2 g GLISSOPAL G1000 plasticizer were added and mixed for 5 minutes. The resulting mixture was removed from the mixer and cooled to room temperature.

Polymer 3—Diallylamine-Modified PIB Using bromo butyl Rubber

In a three-neck, round-bottomed flask equipped with a reflux condenser, thermometer, and a nitrogen inlet was placed bromo butyl rubber (5.0 g), diallylamine (0.28 g), TEA (0.23 g), and toluene (45.00 g). The procedure from this point on followed that described for Polymer 1.

Polymer 4—Farnesol-Modified PIB Using brominated butyl Rubber

In a three-neck, round-bottomed flask equipped with a reflux condenser, thermometer, and nitrogen inlet was placed bromo butyl rubber (15.0 g), farnesol (1.14 g), TBAB (0.55 g), and toluene (135.00 g). The procedure from this point on followed that described for Polymer 1 except that the acetone was used to remove residual farnesol and TBAB.

Polymer 5—Synthesis of Geraniol-Modified PIB Using bromo butyl Rubber

In a three-neck, round-bottomed flask equipped with a reflux condenser, thermometer, and nitrogen inlet was placed bromo butyl rubber (15.0 g), geraneol (0.79 g), TBAB (0.55 g), and toluene (135.00 g). The procedure from this point on followed that described for Polymer 1 except that the acetone was used to remove residual geraniol and TBAB.

Polymer 6—Geranic Acid-Modified PIB Using bromo butyl Rubber

In a three-neck, round-bottomed flask equipped with a reflux condenser, thermometer, and nitrogen inlet was placed bromo butyl rubber (15.0 g), geranic acid (0.86 g), TBAB (0.55 g), and toluene (135.00 g). The procedure from this point on followed that described for Polymer 1 except that the acetone was used to remove residual geranic acid and TBAB.

Polymer 7—10-undecenoic Acid-Modified PIB Using bromo butyl Rubber

In a three-neck, round-bottomed flask equipped with a reflux condenser, thermometer, and nitrogen inlet was placed bromo butyl rubber (15.0 g), 10-undecenoic acid (0.95 g), TBAB (0.55 g), and toluene (135.00 g). The contents of the flask were stirred with a magnetic stir bar under nitrogen at room temperature. The procedure from this point on followed that described for Polymer 1 except that the acetone was used to remove residual 10-undecenoic acid and TBAB.

Polymer 8—trans,trans-2,4-Hexadien-1-ol-Modified PIB Using bromo butyl Rubber In a three-neck, round-bottomed flask equipped with a reflux condenser, thermometer, and nitrogen inlet was placed bromo butyl rubber (15.0 g), trans,trans-2,4-hexadien-1-ol (0.40 g), TBAB (0.55 g), and toluene (135.00 g). The contents of the flask were stirred with a magnetic stir bar under nitrogen at room temperature. The procedure from this point on followed that described for Polymer 1 except that the acetone was used to remove residual trans,trans-2,4-hexadien-1-ol and TBAB.

Polymer 9—2,4-Hexadienoic Acid-Modified PIB Using bromo butyl Rubber

In a three-neck, round-bottomed flask equipped with a reflux condenser, thermometer, and nitrogen inlet was placed bromo butyl rubber (15.0 g), 2,4-hexadienoic acid (0.46 g), TBAB (0.55 g), and toluene (135.00 g). The contents of the flask were stirred with a magnetic stir bar under nitrogen at room temperature. The procedure from this point on followed that described for Polymer 1 except that the acetone was used to remove residual 2,4-hexadienoic acid and TBAB.

Polymer 10—2-allylpent-4-en-1-ol-Modified PIB Using bromo butyl Rubber

In a three-neck, round-bottomed flask equipped with a reflux condenser, thermometer, and nitrogen inlet was placed bromo butyl rubber (15.0 g), 2-allylpent-4-en-1-ol (0.52 g), TBAB (0.55 g), and toluene (135.00 g). The contents of the flask were stirred with a magnetic stir bar under nitrogen at room temperature. The procedure from this point on followed that described for Polymer 1 except that the acetone was used to remove residual 2-allylpent-4-en-1-ol and TBAB.

Polymer 11—2-Allylpent-4-enoic Acid-Modified PIB Using bromo butyl Rubber

In a three-neck, round-bottomed flask equipped with a reflux condenser, thermometer, and nitrogen inlet was placed bromo butyl rubber (15.0 g), 2-allylpent-4-enoic acid (0.58 g), TBAB (0.55 g), and toluene (135.00 g). The contents of the flask were stirred with a magnetic stir bar under nitrogen at room temperature. The procedure from this point on followed that described for Polymer 1 except that the acetone was used to remove residual 2-allylpent-4-enoic acid and TBAB.

Examples 1-4 and Control Compositions C1-C4

Adhesive compositions were prepared by placing 100 parts of Polymer 1 with 400 parts of toluene, 0.2 pph (parts per hundred parts of polymer) photocrosslinker (2,4-bis-trichloromethyl-6(4-methoxy-phenyl)-S-triazine) and varying amounts of tackifier (ESCOREZ 1310) and plasticizer (GLISSOPAL 1000) shown in Table 3 in pph in a 100 mL jar. The jar was capped and mixed on a roller mill overnight. The resulting composition was knife-coated onto a 6 inch by 25 inch strip of polyester film backing (Hostaphan® 3SAB) to a thickness of about 15 mils wet. The coated film was dried in an oven set at 70° C. for 20 minutes to provide a tape having an adhesive coating thickness of 2 mils. The coated tapes were cured by irradiating with UV light (400 mJ/cm$^2$, UVB) using a UV processor (Fusion UV System, Inc., Gaithersburg, Md.).

Control compositions having the same amounts and types of tackifiers and plasticizers with unmodified EXXPRO 3745 in toluene were also prepared (C1, C2, C3, C4) and coated into tapes. No cross linker was added. The tapes were conditioned at 23° C., 50% RH before testing for 90° Peel Adhesion on Santoprene™ and shear strength on stainless steel. Test results are shown Table 2.

TABLE 2

Adhesive Compositions and Properties

| Ex | ESCOREZ 1310 (pph) | GLISSOPAL 1000 (pph) | Peel Adhesion on Santoprene (N/dm) | Failure Mode | Shear at 23° C., 50% RH (min) | Failure Mode |
|---|---|---|---|---|---|---|
| C1 | 10 | 0 | 39 | COH | >10,000 | — |
| C2 | 20 | 0 | 51 | COH | 5,000 | COH |
| C3 | 10 | 10 | 73 | COH | 3,500 | COH |
| C4 | 20 | 10 | 22 | COH | 3,000 | COH |
| 1 | 10 | 0 | 3 | ADH | >10,000 | — |
| 2 | 20 | 0 | 3 | ADH | >10,000 | — |
| 3 | 10 | 10 | 3 | ADH | >10,000 | — |
| 4 | 20 | 10 | 3 | ADH | >10,000 | — |

Examples 5-6

Effect of UV Exposure on Properties

Tapes were prepared as described in Example 3 except that the amount of exposure to UV energy was varied to provide different cross-link densities. The adhesive properties are shown in Table 3.

TABLE 3

Adhesive Properties at Different Amounts of UV Exposure

| Example | UV Exposure (mJ/cm$^2$) | Peel Adhesion on Santoprene (N/dm) | Failure Mode | Room Temperature Shear (minutes) | Failure mode |
|---|---|---|---|---|---|
| 3 | 400 | 3 | ADH | >10,000 | None |
| 5 | 200 | 6 | ADH | >10,000 | None |
| 6 | 100 | 21 | ADH | >10,000 | None |

Examples 7-9

Adhesive compositions for Examples 7-8 were prepared as described in Example 3 and coated into tapes, except that different amounts of an unfunctionalized, medium molecular weight polyisobutylene (OPPANOL B15) shown in Table 5 were added with Polymer 1 and the amount of photocrosslinker was varied. The amounts of ESCOREZ 1310 tackifier and Glissopal 1000 plasticizer were both maintained at 10 pph. The total amount of polyisobutylene in the system remained at 100 parts, but the amount of the modified and unmodified polyisobutylene was varied and shown in Table 4 in parts (parts per 100 parts of polymer).

For Example 9, an adhesive composition was prepared and coated into a tape as described for Example 7 except that Polymer 2 was dissolved in 400 parts of toluene to form a solution of 20% solids solution. Then 15 g of the solution was placed in a glass vial and mixed with 3.5 mg of cross linker (2,4-bis-trichloromethyl-6(4-methoxy-phenyl)-S-triazine) and coated. Test results for Examples 7-9 are shown in Table 4.

TABLE 4

Adhesive Properties with Varied Crosslink Density

| Ex | Polymer Amount (parts) | Oppanol B15 PIB (pph) | Cross linker (pph) | Peel Adhesion on Santoprene (N/dm) | Failure Mode | Room Temp Shear (min) | Failure Mode |
|---|---|---|---|---|---|---|---|
| 3 | 100 | 0 | 0.2 | 3 | ADH | >10,000 | None |
| 7 | 70 | 30 | 0.14 | 11 | ADH | >10,000 | None |
| 8 | 40 | 60 | 0.08 | 33 | ADH | >10,000 | None |
| 9* | 70 | 30 | 0.14 | 10 | ADH | >10,000 | None |

*Prepared with Polymer 2

Examples 10-11

Adhesive tapes were prepared as described in Example 8 except that the amount of UV exposure was varied to change the crosslink density of the adhesive. The tapes were tested for shear at room temperature and at 70° C., and 90° peel adhesive properties on various substrates. Test results are shown in Tables 5 and 6, respectively.

TABLE 5

Shear Properties at Varied Crosslink Densities

| Ex | UV Exposure (mJ/cm$^2$) | Shear at 23° C., 50% RH (min) | Failure Mode | Shear at 70° C. (min) | Failure Mode |
|---|---|---|---|---|---|
| 8 | 400 | >10,000 | None | >10,000 | None |
| 10 | 200 | >10,000 | None | >10,000 | None |
| 11 | 100 | 7,700 | COH | >10,000 | None |

TABLE 6

Peel Properties on Various Substrates

| | 90° Peel Adhesion (N/dm) | | | | | | Failure |
|---|---|---|---|---|---|---|---|
| Ex | HDPE | PP | EPDM | Santoprene | SS | Glass | Mode |
| 8 | 23 | 44 | 42 | 33 | 45 | 39 | ADH |
| 10 | 19 | 34 | 50 | 47 | 53 | 45 | ADH |
| 11 | 22 | 43 | 58 | 49 | 54 | 38 | ADH |

Example 12

An adhesive composition, and a tape made from the composition, was prepared as described in Example 3, using Polymer 3. The tapes were tested for shear strength at 23° C., 50% RH and 90° peel adhesive properties on various substrates. Test results are shown in Table 7.

TABLE 7

Tape Adhesion Properties with Adhesive from Polymer 3

| Ex | Shear at 23° C. (min) | Failure Mode | 90° Peel Adhesion (N/dm) | | | | | | Failure Mode |
|---|---|---|---|---|---|---|---|---|---|
| | | | HDPE | PP | EPDM | Santoprene | SS | Glass | |
| 12 | >10,000 | None | 13 | 35 | 44 | 35 | 32 | 40 | None |

Examples 13-15

Adhesive compositions and tapes for Examples 13-15 were prepared as described in Examples 4, 7, and 8, respectively, except that the modified PIB was Polymer 4. Test results for shear at 23° C., 50% RH and peel adhesion are shown in Table 8.

TABLE 8

Tape Adhesive Properties with Polymer 4, T

| Ex | Shear at 23° C. (min) | Failure Mode | HDPE | PP | EPDM | Santoprene | SS | Glass | Failure Mode |
|---|---|---|---|---|---|---|---|---|---|
| 13 | 5000 | COH, 2B | 24 | 39 | 48 | 52 | 31 | 23 | ADH |
| 14 | 1200 | COH | 16 | 26 | 49 | 45 | 33 | 17 | ADH |
| 15 | 540 | COH | 12 | 20 | 35 | 31 | 35 | 24 | ADH |

Examples 16-18

Adhesive compositions and tapes for Examples 16-18 were prepared as described in Examples 13-15, respectively except that the modified PIB was Polymer 5. Test results for shear at 23° C., 50% RH and peel adhesion are shown in Table 9.

TABLE 9

Tape Adhesive Properties with Polymer 5

| Ex | Room Temp Shear (min) | Failure Mode | HDPE | PP | EPDM | Santoprene | SS | Glass | Failure Mode |
|---|---|---|---|---|---|---|---|---|---|
| 16 | 4100 | COH, 2B | 25 | 38 | 74 | 75 | 45 | 35 | ADH |
| 17 | 2600 | COH, 2B | 14 | 32 | 46 | 51 | 26 | 9 | ADH |
| 18 | 800 | COH | 17 | 30 | 42 | 37 | 22 | 15 | ADH |

Examples 19-21

Adhesive compositions and tapes for Examples 19-21 were prepared as described in Examples 13-15, respectively, except that the modified PIB was Polymer 6. Test results for shear at 23° C., 50% RH and peel adhesion are shown in Table 10.

TABLE 10

Tape Adhesive Properties with Polymer 6

| Ex | Room Temp Shear (min) | Failure Mode | HDPE | PP | EPDM | Santoprene | SS | Glass | Failure Mode |
|---|---|---|---|---|---|---|---|---|---|
| 19 | >10,000 | None | 14 | 42 | 31 | 51 | 30 | 21 | ADH |
| 20 | 2600 | COH, 2B | 27 | 52 | 59 | 65 | 48 | 36 | ADH |
| 21 | 730 | COH | 34 | 71 | 45 | 43 | 93 | 57 | ADH |

Examples 22-24

Adhesive compositions and tapes for Examples 22-24 were prepared as described in Examples 13-15, respectively, except that the modified PIB was Polymer 7. Test results for shear at 23° C., 50% RH and peel adhesion are shown in Table 11.

TABLE 11

Tape Adhesive Properties with Polymer 6

| Ex | Room Temp Shear (min) | Failure Mode | HDPE | PP | EPDM | Santoprene | SS | Glass | Failure Mode |
|---|---|---|---|---|---|---|---|---|---|
| 22 | 7100 | COH, 2B | 27 | 66 | 58 | 66 | 59 | 38 | ADH |
| 23 | 2600 | COH, 2B | 35 | 76 | 62 | 68 | 67 | 55 | ADH |
| 24 | 700 | COH | 46 | 69 | 47 | 44 | 107 | 12 | ADH |

Examples 25-26

Adhesive compositions and tapes for Examples 25-26 were prepared as described in Table 12 with Polymer 8. Test results for shear at 23° C., 50% RH and peel adhesion are shown in Table 13.

TABLE 12

Tape Compositions and Curing Conditions with Polymer 8

| Ex | Polymer Amount (parts) | Oppanol B15 PIB (pph) | Tackifier Escorez 5340 (pph) | Cross linker (pph) | UV Exposure (mJ/cm$^2$) |
|---|---|---|---|---|---|
| 25 | 100 | 0  | 20 | 0.2 | 400 |
| 26 | 70  | 30 | 20 | 0.2 | 400 |

TABLE 13

Tape Adhesive Properties with Polymer 8

| Ex | Room Temp Shear (min) | Failure Mode | HDPE | PP | EPDM | Santoprene | SS | Glass | Failure Mode |
|---|---|---|---|---|---|---|---|---|---|
| 25 | >10,000 | None | 17 | 26 | 36 | 68 | 50 | 24 | ADH |
| 26 | >10,000 | None | 15 | 19 | 27 | 68 | 40 | 11 | ADH |

Examples 27-28

Adhesive compositions and tapes for Examples 27-28 were prepared as described in Examples 25-26, respectively, except that the modified PIB was Polymer 9. Test results for shear at 23° C., 50% RH and peel adhesion are shown in Table 14.

TABLE 14

Tape Adhesive Properties with Polymer 9

| Ex | Room Temp Shear (min) | Failure Mode | HDPE | PP | EPDM | Santoprene | SS | Glass | Failure Mode |
|---|---|---|---|---|---|---|---|---|---|
| 27 | >10,000 | None | 33 | 43 | 47 | 64 | 69 | 44 | ADH |
| 28 | >10,000 | None | 24 | 57 | 63 | 75 | 70 | 57 | ADH |

Examples 29-30

PIB was Polymer 10. Test results for shear at 23° C., 50% RH and peel adhesion are shown in Table 15.

TABLE 15

Tape Adhesive Properties with Polymer 10

| Ex | Room Temp Shear (min) | Failure Mode | HDPE | PP | EPDM | Santoprene | SS | Glass | Failure Mode |
|---|---|---|---|---|---|---|---|---|---|
| 29 | >10,000 | None | 22 | 66 | 28 | 47 | 51 | 37 | ADH |
| 30 | 8,300  | COH  | 29 | 62 | 47 | 63 | 51 | 37 | ADH |

Examples 31-32

Adhesive compositions and tapes for Examples 31-32 were prepared as described in Examples 25-26, respectively, except that the modified PIB was Polymer 11. Test results for shear at 23° C., 50% RH and peel adhesion are shown in Table 16.

TABLE 16

Tape Adhesive Properties with Polymer 11

| Ex | Room Temp Shear (min) | Failure Mode | HDPE | PP | EPDM | Santoprene | SS | Glass | Failure Mode |
|---|---|---|---|---|---|---|---|---|---|
| 31 | >10,000 | None | 14 | 40 | 41 | 87 | 55 | 10 | ADH |
| 32 | 7,100   | COH  | 26 | 57 | 61 | 96 | 62 | 71 | ADH |

Examples 33-50

The gel content of Polymers 1, and 2-11 was determined by using only the polymer and a cross linker without tackifier or plasticizer. Each composition was prepared by dissolving 100 parts of the polymer in 400 parts of toluene and adding the cross linker in the amounts shown in pph. Crosslinker I was 2,4-bis-trichloromethyl-6(4-methoxy-phenyl)-S-triazine, and Crosslinker II was benzophenone. Each composition was coated to the sample thickness indicated and dried in an oven set at 70° C. The compositions were cured with the amounts of UV energy shown in Table 17. The gel content of each cured composition was determined as described in the Test Methods.

TABLE 17

Percent Gel Test Results

| Ex | Polymer | Cross-linker | Cross-linker Wt % | Thickness (mil) | UV Energy (mJ/cm$^2$) | Gel Content (wt %) |
|---|---|---|---|---|---|---|
| 33 | 1 | I | 0.2 | 2 | 400 | 85 |
| 34 | 1 | I | 0.2 | 6 | 400 | 73 |
| 35 | 1 | I | 0.2 | 2 | 200 | 67 |
| 36 | 1 | I | 0.2 | 2 | 100 | 31 |
| 37 | 1 | II | 0.2 | 2 | 1000 | 75 |
| 38 | 1 | II | 0.2 | 2 | 500 | 86 |
| 39 | 1 | II | 0.2 | 2 | 250 | 47 |
| 40 | 3 | I | 0.2 | 2 | 400 | 73 |
| 41 | 3 | I | 0.2 | 2 | 200 | 70 |
| 42 | 3 | I | 0.2 | 2 | 100 | 67 |
| 43 | 4 | I | 0.2 | 2 | 400 | 52 |
| 44 | 5 | I | 0.2 | 2 | 400 | 58 |
| 45 | 6 | I | 0.2 | 2 | 400 | 61 |
| 46 | 7 | I | 0.2 | 2 | 400 | 54 |
| 47 | 8 | I | 0.2 | 2 | 400 | 58 |
| 48 | 9 | I | 0.2 | 2 | 400 | 60 |
| 49 | 10 | I | 0.2 | 2 | 400 | 55 |
| 50 | 11 | I | 0.2 | 2 | 400 | 37 |

What is claimed is:

1. An adhesive composition comprising: a) an isobutylene copolymer having pendent, free-radically polymerizable, ethylenically unsaturated groups, b) a tackifier, and c) a photocrosslinking agent, wherein the copolymer is of the formula;

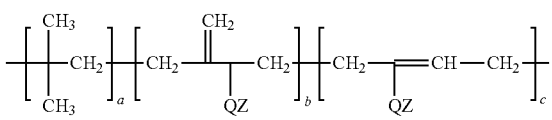

wherein a is at least 20, and at least one of b and c are at least one,

Q is a divalent linking groups and Z is a pendent, free-radically polymerizable, ethylenically unsaturated group.

2. The adhesive composition of claim 1 comprising greater than 0% by weight but less than 20% by weight of polymerized monomer units having pendent, free-radically polymerizable, ethylenically unsaturated groups.

3. The adhesive composition of claim 2 wherein the polymerized monomer units having pendent, free-radically polymerizable, ethylenically unsaturated groups are isoprene monomer units.

4. The adhesive composition of claim 1 wherein the free-radically polymerizable, ethylenically unsaturated groups are alkenyl groups.

5. The adhesive composition of claim 1 comprising greater than 0 to 150 parts by weight of said tackifier per 100 parts by weight of said copolymer.

6. The adhesive composition of claim 1 comprising 10 to 100 parts by weight of said tackifier per 100 parts by weight of said copolymer.

7. The adhesive composition of claim 1 wherein the photocrosslinking agent is selected from aldehydes; ketones; quinones; thioxanthones and chromophore-substituted vinyl halomethyl-sym-triazines photocrosslinking agents.

8. The adhesive composition of claim 1 wherein the copolymer has a molecular weight (Mw) of 50,000 to 5,000,000.

9. The adhesive composition of claim 1 wherein Z is an alkenyl-containing group.

10. The adhesive composition of claim 1 wherein the -Q-Z moiety is of the formula:

$$-R^1-\left[-X^1-R^2-\left[\begin{matrix}R^5 & R^5 \\ \diagup & \diagdown \\ & \\ R^5\end{matrix}\right]_q\right]_r,$$

where
R$^1$ is a multivalent alkylene or arylene, X$^1$ is —O—, —O$_2$C—, —NR$^4$—, where R$^4$ is H or C$_1$-C$_4$ alkyl, or —R$^2$—C(R$^5$)=CR$^5_2$; R$^2$ is a multivalent alkylene or arylene, and each R$^5$ is independently selected from H or C$_1$-C$_4$ alkyl, and any two of the R$^5$ groups may be taken together to form a carbocyclic ring, r is 1 to 5, and q is 1 or 2.

11. The adhesive composition of claim 1 wherein Q-Z is of the formula:

$$-R^1-X^1-R^2-(-CH=CH_2)_q,$$

wherein R$^1$ is a multivalent alkylene or arylene, X$^1$ is —O—, —O$_2$C—, —NR$^4$—, where R$^4$ is H or C$_1$-C$_4$ alkyl, or —R$^2$—C(R$^5$)=CR$^5_2$; and R$^2$ is a multivalent arylene or alkylene, and q is 1 or 2, and R$^5$ is independently H or a C$_1$ to C$_4$ alkyl.

12. The adhesive composition of claim 11 wherein R$^1$ is a divalent alkylene or arylene, and R$^2$ is a divalent alkylene.

13. The adhesive composition of claim 1 wherein -Q-Z is derived from a terpene alcohol or acid.

14. The crosslinked adhesive composition of claim 1.

15. An adhesive article comprising a crosslinked coating of the adhesive of claim 1 on a backing.

16. The adhesive composition of claim 1, wherein the adhesive is a hot-melt adhesive.

17. The adhesive composition of claim 1, wherein said isobutylene copolymer having pendent, free-radically polymerizable, ethylenically unsaturated groups, is prepared by nucleophilic displacement of a halogenated isobutylene copolymer, with a nucleophilic ethylenically unsaturated compound.

18. The adhesive composition of claim 17 wherein the nucleophilic ethylenically unsaturated compound is of the formula:

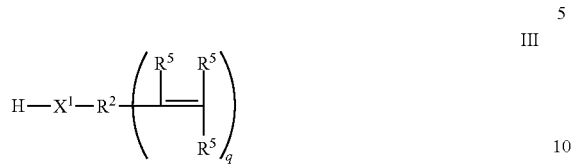

III wherein
$X^1$ is —O—, —O$_2$C—, —NR$^4$—, where $R^4$ is H or $C_1$-$C_4$ alkyl, or —R$^2$—C(R$^5$)=CR$^5{}_2$; $R^2$ is a multivalent saturated or unsaturated alkylene or arylene, and each $R^5$ is independently selected from H or $C_1$-$C_4$ alkyl, and any two of the $R^5$ groups may be taken together to form a carbocyclic ring, and q is 1 or 2.

19. The adhesive composition of claim 18 wherein the nucleophilic ethylenically unsaturated compound is a terpene alcohol or terpene acid.

\* \* \* \* \*

UNITED STATES PATENT AND TRADEMARK OFFICE
CERTIFICATE OF CORRECTION

PATENT NO. : 8,597,784 B2
APPLICATION NO. : 13/169573
DATED : December 3, 2013
INVENTOR(S) : Hae-Seung Lee et al.

Page 1 of 1

It is certified that error appears in the above-identified patent and that said Letters Patent is hereby corrected as shown below:

In the Specification

Column 1,
Line 6, delete "APPLICATIONS" and insert -- APPLICATION --, therefor.

Column 4,
Lines 40-44, delete " 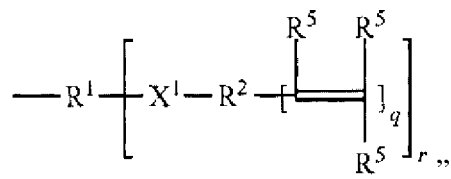 "

and insert --  --.

In the Claims

Column 25,
Line 16, in Claim 18, delete "and each" and insert -- each --, therefor.

Signed and Sealed this
Twenty-seventh Day of May, 2014

Michelle K. Lee
*Deputy Director of the United States Patent and Trademark Office*